(12) United States Patent
Leske

(10) Patent No.: US 7,644,965 B2
(45) Date of Patent: *Jan. 12, 2010

(54) PROTECTOR ASSEMBLY FOR A ROLL CAGE ON A VEHICLE

(75) Inventor: Thomas R. Leske, Oshkosh, WI (US)

(73) Assignee: S.-I. Incorporated, Oshkosh, WI (US)

( * ) Notice: Subject to any disclaimer, the term of this patent is extended or adjusted under 35 U.S.C. 154(b) by 266 days.

This patent is subject to a terminal disclaimer.

(21) Appl. No.: 11/903,976

(22) Filed: Sep. 24, 2007

(65) Prior Publication Data

US 2008/0100072 A1 May 1, 2008

Related U.S. Application Data

(63) Continuation-in-part of application No. 11/120,713, filed on May 3, 2005, now Pat. No. 7,293,808.

(51) Int. Cl.
*B60R 19/02* (2006.01)
(52) U.S. Cl. .................. 293/102; 296/190.03; 280/756
(58) Field of Classification Search ............ 296/190.03; 293/102, 117, 121, 128; 280/756; 138/140
See application file for complete search history.

(56) References Cited

U.S. PATENT DOCUMENTS

| 4,666,196 | A | | 5/1987 | McCoy et al. |
| 4,688,846 | A | * | 8/1987 | Martin, Jr. .................. 296/102 |
| 5,283,096 | A | | 2/1994 | Greenberg et al. |
| 6,416,095 | B1 | | 7/2002 | Keys et al. |
| 6,527,319 | B1 | | 3/2003 | Martel |
| 6,679,520 | B2 | | 1/2004 | Kurata et al. |

* cited by examiner

*Primary Examiner*—Glenn Dayoan
*Assistant Examiner*—Melissa A Black
(74) *Attorney, Agent, or Firm*—Thomas J. Connelly; Wilhelm Law, S.C.

(57) ABSTRACT

A protector assembly for a roll cage on a vehicle. The protector assembly includes a roll cage having a pair of uprights, each of the uprights having a first end secured to the vehicle and a second end secured to a roof member. Each of the uprights also has an outer surface facing outward away from the vehicle. A removable insert is secured to the outer surface of each of the uprights and protects the uprights from coming in contact with another member and being worn down.

20 Claims, 7 Drawing Sheets

PROTECTOR ASSEMBLY FOR A ROLL CAGE ON A VEHICLE

CROSS-REFERENCE TO RELATED APPLICATION

This application is a continuation-in-part of U.S. patent application Ser. No. 11/120,713 filed May 3, 2005.

BACKGROUND OF THE INVENTION

The present invention relates to a protector assembly for a roll cage on a vehicle. The protector assembly provides wear-protection to the tubing used to form the roll cage, to the extruded, cast, forged, machined, or otherwise formed uprights of the roll cage, and/or to other members of the roll cage, from grinding, scraping, cutting, abrading, and/or other wear.

Tubing and/or other elongate members are used to form roll cages in vehicles. One such category of vehicles in which roll cages are often implemented is forklift vehicles. However, many other vehicles also use roll cages, including but not limited to: various vehicles used to move material and equipment within a factory or warehouse, cranes, industrial and farm tractors, utility vehicles, crane type vehicles used in multi-storied warehouses, racing cars and trucks, etc. Such vehicles can come in contact with stationary or movable objects, or other vehicles, and this continuous contact can cause a roll cage to wear in certain locations. The protector assembly is designed to accept such wear in order to preserve the roll cage.

A roll cage on a forklift vehicle typically includes cage-uprights, e.g. four generally upright pieces of tubing which extend upwardly from the chassis and/or body of the vehicle. The uppermost portions of the cage-uprights are connected to each other by generally horizontally oriented pieces of tubing. The upright and horizontal tubing members collectively define an enclosure structure which encapsulates the forklift operator.

Accordingly, the roll cage of a forklift provides the operator some protection in certain adverse situations. Exemplary of such adverse situations are roll-overs, side impacts, failings objects, and others.

Forklifts are used for lifting, lowering, and transporting objects, loads, and/or other goods, whereby they are particularly well suited for use in warehousing environments. Factories and warehouses often include racking e.g. racks and/or series of racks, to enable a user to store goods vertically, which relatively increases the useful storage space of the available ground square footage as compared to a warehouse without racking.

Warehouse racking can be arranged in a variety of suitable configurations. Exemplary of such configurations are drive-in racking configurations and drive-through racking configurations. Drive-in and through racking configurations have rows which include aisles defined between adjacent upright structures of e.g. pallet racking. Each row is commonly used to store product all of a single, or various few, kind/sku.

The pallet racking has elongate L-shaped brackets, or rails, which extend along the length of the row and generally define the outermost perimeter of the respective aisle. In other words, the L-shaped brackets or rails each have a vertical rail portion, and a horizontal rail portion which extends outwardly into the aisle e.g. generally parallel to the ground.

In drive-in and through racking configurations, the distance between the L-shaped rails corresponds to the width of a pallet to be stored thereupon. And the distance between the edges of the horizontal rail portions, of the L-shaped rails on opposite sides of the same aisle, which extend furthest into the aisle, is of lesser magnitude than the magnitude of the width dimension of the pallet. Thus, when a forklift operator wishes to store a pallet on, for example, a second level of the racking, the operator must first lift the pallet load to a height which is greater than the height of the second level of the racking before the pallet enters the racking. Then the forklift operator can drive the pallet into the second level of the racking as desired.

When a forklift operator drives the pallet sufficiently far into the racking, the forklift itself enters the aisle. And since the edges of the horizontal rail portions extend relatively far into the aisles and thus since the aisles are relatively narrow, portions of the forklift vehicles traveling down the aisles, namely the roll cages, are susceptible to contact with horizontal rail portions.

Since the rows tend to be commonly used to store product all of a single, or various few, kind/sku, the height levels at which the L-shaped rails are installed is generally constant along the entire length of any particular row e.g. on both sides of any aisle. Thus, when a forklift operator makes multiple passes down the same aisle, the operator subjects the same portion of the roll cage to contact with the horizontal rail portion. Over time, the contact on that portion of the roll cage is cut into, and/or material is otherwise removed, by the horizontal rail portion.

In other words, as the driver drives the pallet along the length of the aisle, thus to put the pallet in the stack or upon the rack, or to remove the pallet from the stack or rack, the driver focuses his/her attention on the pallet, and drives the forklift so as to facilitate movement of the pallet relative to the racking. Meantime, the cage of the forklift is only a little narrower than the space between the side racking elements, namely the horizontal rail portions.

As a result, since the driver is concentrating on the movement and condition of the pallet, not on the movement of the forklift per se, the cage routinely scrapes along the edge of the horizontal member of the racking at the first level.

Since all of the racking within an aisle, and sometime within a warehouse, is built at a common height, the scraping on the cage is all at a given height on the cage uprights. While the racking horizontal rail portion is not per se sharp, it is relatively thin and strong, whereby repeated, and/or prolonged scraping of the cage uprights on the racking causes the racking to cut into the cage uprights. If the cage uprights are not properly serviced, one or more of the uprights becomes so worn/cut through that the corresponding upright is no longer able to serve its desired protective function.

Damaged cage uprights cannot be repaired by e.g. welding, under current safety guidelines because of the potential for defects in a field-applied welding process. Accordingly, it is common for forklift operators or owners to replace the cage and/or a cage assembly at regular intervals, at substantial cost to the owner of the forklift. Such costs are measured both in terms of cost of the replacement parts, the cost of the downtime of the machine, and potentially, downtime of the operator.

Therefore, it is desirable to provide a protective assembly for a roll cage on a vehicle which is adapted and configured to absorb any scraping, grinding, physical contact, etc. caused by moving the vehicle pass a stationary or movable object.

SUMMARY OF THE INVENTION

This invention provides a protective assembly for a roll cage on a vehicle. The roll cage includes a pair of uprights, each of the uprights having a first end secured to the vehicle and a second end secured to a roof member. Each of the uprights has an outer surface facing outward away from the vehicle. A removable insert is secured to the outer surface of each of the uprights. The removable insert is capable of protecting the upright to which it is secured from coming in contact with another member and being worn down.

The protective assembly can be used on a forklift roll cage. The protective assembly can include a housing attached to a forklift roll cage and a removable insert which has a length dimension, an inwardly facing surface and an outwardly facing surface. The inwardly facing surface of the removable insert communicates with an outwardly facing surface of the housing. The outwardly facing surface of the removable insert faces outwardly away from the housing and the roll cage. The removable insert interfaces with the housing and reduces or attenuates scraping, cutting, and/or other wear on the roll cage.

In a first family of embodiments, the invention comprehends a forklift roll cage protector, comprising: (a) a housing attached to a such forklift roll cage, the housing having a length dimension, an inwardly facing surface, and an outwardly facing surface; and (b) an insert having a length dimension, an inwardly facing surface and an outwardly facing surface, the insert inwardly facing surface communicating with the housing outwardly facing surface; the insert removably interfacing with the housing.

In a second family of embodiments, the invention comprehends a roll cage protector assembly, comprising: (a) a housing attached to a such roll cage, the housing having an inwardly facing surface and an outwardly facing surface, the outwardly facing surface having a bracket extending outwardly therefrom, the bracket having an inner surface; and (b) an insert having a length dimension, a width dimension, and a thickness dimension; the bracket inner surface generally defining an outermost perimeter of a bracket cavity and the insert removably received into the bracket cavity.

In a third family of embodiments, the invention comprehends a tubing protector assembly for protecting a piece of tubing, comprising: (a) a first elongate protector member; and (b) a second elongate protector member removably interfacing with the first elongate protector member; wherein at least one of the first and second elongate protector members communicates with a such piece of tubing, and at least one of the first and second elongate protector members comprises a polymeric material.

DETAILED DESCRIPTION OF THE INVENTION

Figure 1:
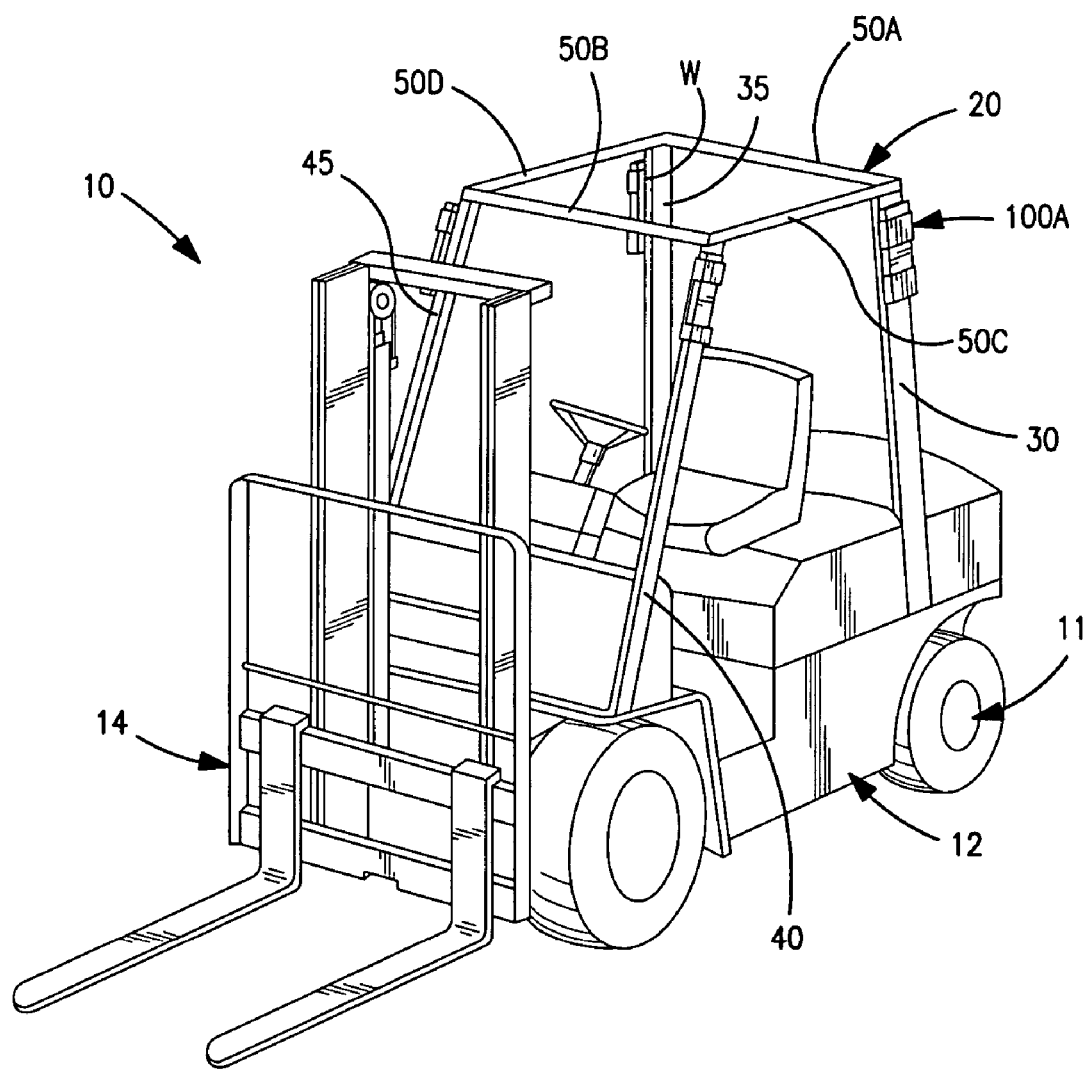
FIG. 1 shows a pictorial view of a first embodiment of forklift roll cage protector assemblies of the invention, installed on a first forklift.

FIG. 1 shows a first embodiment of a protector assembly for a roll cage on a vehicle. In a typical implementation of the invention, at least one protector assembly 100A is attached to a vehicle 10, shown as a forklift, namely on a roll cage 20. It should be understood that even though the invention will be described relative to a forklift, that the vehicle 10 can be any vehicle known to those skilled in the art. The vehicle can be any motorized or non-motorized vehicle used to move material and equipment within a factory, a warehouse, on a farm, etc. The vehicle can be a movable crane, an industrial tractor, a farm tractor, a utility vehicle, a crane type vehicle used in a multi-storied warehouse, a racing car, a racing truck, etc. The vehicle can be a trailer that is pulled or pushed by a motorized vehicle. Such a vehicle can come in contact with a stationary or a movable object, or other vehicles, and such continuous contact can cause a roll cage to wear in certain locations. The protector assembly is designed to accept such wear in order to preserve the roll cage.

In general, the forklift 10 includes a carriage 11, a body 12, a lift mechanism 14, and the roll cage 20. The carriage 11 includes at least some of e.g. a vehicle frame, the running gear such as various internal combustion engines, electric motors, transmissions, transaxles, other gearboxes, various suspension components, driveshafts, axles, hubs, wheels, tires, and/or other components. The assemblage of the carriage 11 provides the power for the vehicle and the means to transmit the vehicle power to the driving surface, e.g. the ground or floor.

The body 12 includes a variety of body panels, shells, seats, and/or other accessories which generally enclose the mechanicals of carriage 11. Thus, the body 12 provides protection to the mechanicals of the remainder of the forklift 10, and protects the operator, and others nearby, from exposure to e.g. various moving or otherwise dangerous parts.

The lift mechanism 14 defines the "fork" of the forklift 10 and is attached to the carriage 11 and/or to the body 12. The lift mechanism 14 includes, for example, metallic prongs or forks which are adapted and configured to, along with other components, lift, carry, and/or otherwise manipulate, palletized loads, e.g. loads which are on pallets. In addition, the lift mechanism 14 includes a generally vertically positioned and oriented boom which is adapted and configured to lift and lower the forks, and thus pallets, generally upwardly and downwardly.

Figure 2:
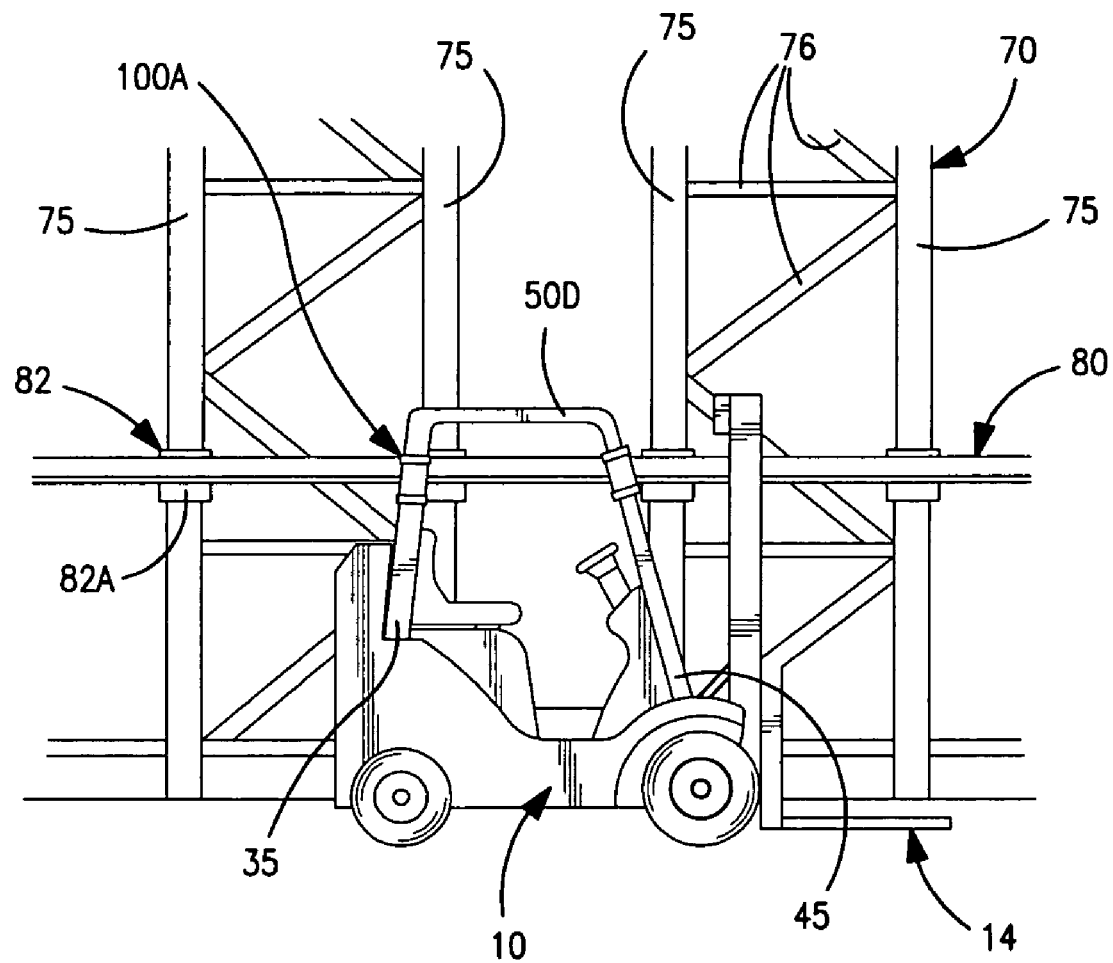
FIG. 2 shows a side elevation view of a second forklift, in an aisle of pallet racking, with forklift roll cage protector assemblies of the invention installed thereupon.

The roll cage 20 is attached to the carriage 11 and/or to the body 12, and provides protection to the operator of the forklift 10. The roll cage 20 includes at least a pair of uprights. As illustrated, the roll cage 20 includes a pair of rear uprights 30 and 35, a pair of front uprights 40 and 45, and roof members 50A, 50B, 50C, and 50D. Each of the pair of rear uprights 30 and 35 is an elongate member which has a first end connected to the vehicle, for example, the carriage 11 and/or to the body 12, and a second end secured to a roof member 50A, 50C or 50D. Each of the pair of rear uprights 30 and 35 has an outer surface which faces outward away from the vehicle. Each of the pair of rear uprights 30 and 35 extends upwardly and vertically, for example, perpendicularly with respect to the ground or floor, such as illustrated in FIG. 1, or at a non-perpendicular angle with respect to the ground or floor, such as illustrated in FIG. 2, optionally others.

Each of the pair of front uprights 40 and 45 is an elongate member which has a first end connected to the vehicle, for example, the carriage 11 and/or to the body 12, and a second end secured to a roof member 50B, 50C or 50D. Each of the pair of front uprights 40 and 45 has an outer surface which faces outward away from the vehicle. Each of the pair of front uprights 40 and 45 extends upwardly and vertically, for example, at a non-perpendicular angle with respect to the ground or floor, such as illustrated in the Figs., optionally perpendicularly with respect to the ground or floor (not illustrated), optionally others.

The roof members 50A, 50B, 50C, and 50D connect the rear and front uprights 30, 35, 40, and 45 to each other. The roof member 50A is an elongate member which extends between the rear upright 30 and the rear upright 35. Thus, a first end of the roof member 50A is connected to the uppermost end of the rear upright 30 and a second, opposite end of the roof member 50A is connected to the uppermost end of the rear upright 35.

The roof member 50B extends parallel to the roof member 50A. A first end of the roof member 50B is connected to the uppermost end of the front upright 40 and a second, opposite end of the roof member 50B is connected to the uppermost end of the front upright 45.

The roof member 50C extends perpendicularly between respective ends of the roof members 50A and 50B. A first end of the roof member 50C is connected to the uppermost end of the rear upright 30 and a second, opposite end of the roof member 50C is connected to the uppermost end of the front upright 40.

The roof member 50D extends perpendicularly between respective ends of the roof members 50A and 50B, and extends parallel to the roof member 50C. A first end of the roof member 50D is connected to the uppermost end of the rear upright 35 and a second, opposite, end of the roof member 50D is connected to the uppermost end of the front upright 45.

Accordingly, the roof members 50A, 50B, 50C, and 50D collectively define a generally rectangular roof frame structure. The uprights, e.g. the pair of rear uprights 30 and 35 and the pair of front uprights 40 and 45, extend downwardly from the roof frame structure and connect the roof frame structure to the remainder of forklift vehicle 10, whereby the overall assemblage of the roll cage 20 provides a safety enclosure for the operator of forklift vehicle 10.

One or more of the components of the roll cage 20 are made from materials which are suitably strong, resilient, durable, and have other characteristics suitable for the intended useful life in the intended environment. Exemplary to such materials are various metallic materials, and/or compounds, such as aluminum, steel, their various alloys, and/or others. Also, the components of the roll cage 20 can be in a variety of configurations. As one example, the pair of rear uprights 30 and 35, the pair of front uprights 40 and 45, and the roof members 50A, 50B, 50C, and 50D can be formed as tubular structures e.g. rectangular or circular tubing, alternatively solid structures such as solid round, square, or other stock, alternatively angle-iron, channel-iron, I-beam, and/or other stock. Accordingly, references herein to tubing, or other specific e.g. structures or types of stock, apply equally as well to all other suitable material types and configurations.

Figure 3:
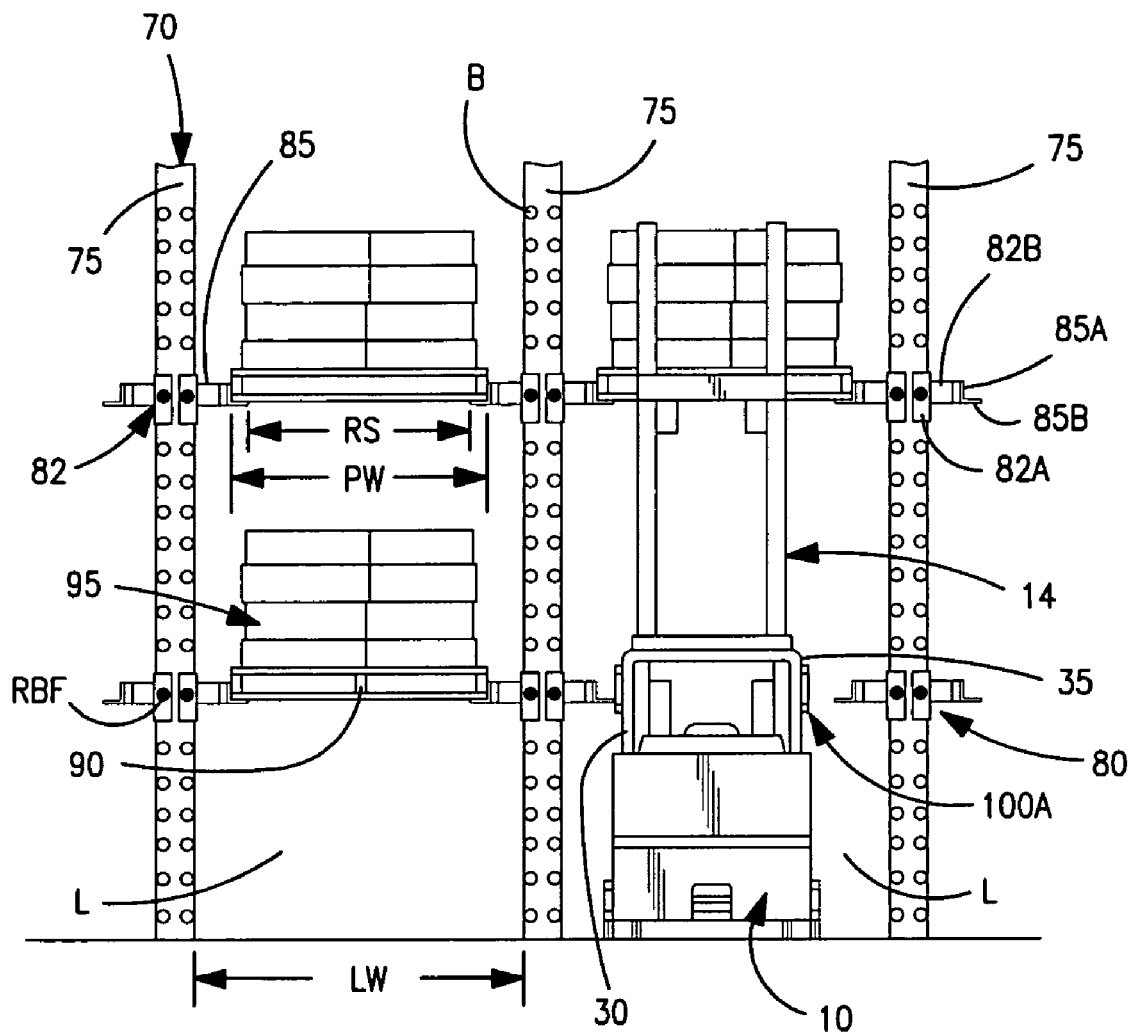
FIG. 3 shows a rear elevation view of the forklift of FIG. 2, lifting a pallet load for receipt into a pallet rack, with forklift roll cage protector assemblies of the invention installed thereupon.
Figure 4:
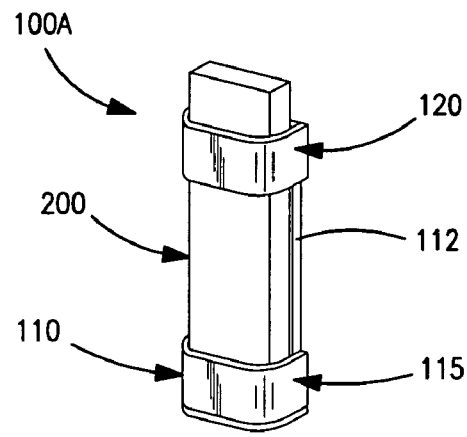
FIG. 4 shows an enlarged, pictorial, view of one of the forklift roll cage protector assemblies of FIG. 1.

Referring now to FIG. 3, the forklift 10 is adapted and configured to lift, lower, carry, transport and/or otherwise manipulate e.g. a pallet 90, for example in a warehouse environment. Warehouse environments typically include series of racking structures, e.g. a racking assembly 70, which includes various components including, but not limited to: racking upright members 75, racking cross-members 76, see FIG. 2, and one or more pallet support rail assemblies 80, see FIG. 2.

FIGS. 2 and 3 illustrate a warehouse style racking configured in a drive-in or drive-through configuration. The racking upright members 75 are elongate members which extend upwardly, perpendicularly from the floor of the warehouse. As visible in FIG. 3, a plurality of through bores "B" extend through ones of the upright members 75, which enable various other components of the racking assembly 70 to be bolted, pinned, and/or otherwise attached, to the upright members 75.

A number of cross-members 76 can extend between and connect various adjacent pairs of the upright members 75, see FIG. 2. As desired, the cross-members 76 extend perpendicularly, and/or otherwise angularly between, the various adjacent pairs of the upright members 75, so as to provide the suitable levels of weight, rigidity, strength, durability, bracing, and/or other desired characteristics of the racking assembly 70.

Multiple ones of the pairs of the upright members 75, connected by the cross-members 76, are aligned in a coplanar fashion. In other words, a plurality of the upright members 75, spaced from each other, extends along a generally straight line path, and thereby defines an elongate column or open wall, e.g. the series of the upright members 75 defines one side of a lane or aisle such as a lane "L". The other side of the same, respective, lane or aisle is defined by another elongate column or open wall which is defined by a plurality of the upright members 75. Each column or open wall is spaced from each other and extend along a straight line path. FIG. 2 shows a side view of a portion of one elongate column or open wall.

Referring now to FIG. 3, each of the lanes "L" is an elongate void which extends between and is defined by adjacent ones of elongate columns consisting of the upright members 75. The operator of the forklift 10 drives the forklift into, out of, and/or through the lanes "L" and correspondingly e.g. stores loads therein or removes loads therefrom. Typically, each of the lanes "L" is used to store product all of a single, or various few, kind/sku, whereby like products are stored proximate each other.

The lane "L" has an opening width dimension "LW" which is greater in magnitude than the magnitude of the width of the forklift 10. Also, the lane "L" has a length dimension (not labeled) which extends perpendicularly to the lane width dimension. A portion of the length dimension (not labeled) of the lane "L" is illustrated in FIG. 2, while the width dimension "LW" is illustrated in FIG. 3.

Referring again to FIGS. 2 and 3, a pallet support rail assembly 80 includes support rail brackets 82 and pallet rails 85, and is adapted and configured to at least partially bear the weight of e.g. a pallet 90 and/or a load 95. The support rail brackets 82 provide, at least partially, the means to attach the support rail assembly 80 to the racking assembly 70, and include an upright interface 82A and a post member 82B. The pallet support rail assemblies 80 extend partially into the respective lanes "L" and define separate, vertical, levels or tiers of the racking assembly 70.

The upright interface 82A is adapted and configured to interface and cooperate with ones of the uprights 75, and/or other components of the racking assembly 70. The upright interface 82A is an elongated, L-shaped member, and is vertically oriented, whereby it appears L-shaped when viewed from above or below. Thus, the upright interface 82A has first and second portions which perpendicularly interface with each other to collectively define the L-shaped upright interface.

The first portion of the upright interface 82A is planar, as illustrated in FIG. 3, and has an inner surface and an outer surface. The first portion of the upright interface 82A also has a bore which extends therethrough. The inner surface of the first portion is in face to face communication with a corresponding outwardly facing surface of the upright member 75. The outer surface of the first portion faces in an opposite direction, namely in the same direction as the outwardly facing surface of the upright member 75 through which bores "B" extend.

In the complete assemblage of the racking assembly 70, the bore through the first portion of the upright interface 82A and the bore which extends through the corresponding upright member 75 are aligned coaxially to one another. A fastening device, e.g. rail bracket fastener "RBF" extends through the bore of the upright interface 82A and the bore of the upright member 75, thereby mechanically connecting the upright member 75 and the support rail assembly 80. Therefore, the height or level at which goods and/or other articles are stored upon the racking assembly 70 is determined, at least in part, by which particular ones of the bores of the upright member 75 and the bores of the upright interface 82A are aligned, and thus at which height or level that the pallet support rail assembly 80 is attached to the remainder of the racking assembly 70.

In some embodiments, the upright interface 82A has more than one bore extending therethrough, adapted and configured to cooperate with corresponding multiple bores "B" of the upright members 75. In such embodiments, multiple ones of the rail bracket fasteners "RBF" can be used at each of the upright interfaces 82A when additional strength, stability, and/or holding power, is desired from multiple fasteners on a single rail bracket.

The second portion of the upright interface 82A is planar as illustrated in FIG. 2. The second portion of the upright interface 82A has an inner surface, an outer surface, and first and second lateral edges. One of the first and second lateral edges of the second portion is attached to a corresponding lateral edge of the first portion of the upright interface 82A.

The inner surface of the second portion of the upright interface 82A is in face to face communication with a corresponding surface of the upright member 75 which faces toward the lane "L". The outer surface of the second portion of the upright interface 82A faces in an opposite direction. Namely, the outer surface of the second portion faces toward the lane "L" instead of toward the upright member 75, like the inwardly facing surface. The outwardly facing surface, which faces toward the lane "L", is connected to the post member 82B.

The post member 82B is an elongated member which extends from the upright interface 82A into the lane "L". The end of the post member 82B, which is not connected to the upright interface 82A, is connected to the pallet rail 85.

The pallet rail 85 is an elongated, L-bracket, angle-iron, or other shelf-type structure, which extends along the length of the lane "L". The pallet rail 85 includes first and second portions or segments, namely vertical rail member 85A and horizontal rail member 85B, each of which extends along the length of the lane "L".

The vertical rail members 85A are planar and have inwardly facing surfaces and outwardly facing surfaces which are perpendicular to the ground or floor. The inwardly facing surface of each of the vertical rail member 85A faces the upright members 75, and the outwardly facing surface of each of the rail member 85A faces toward the lane "L". The post members 82B are attached to the inwardly facing surface of the vertical rail member 85A at various loci, spaced from each other, along the length of the vertical rail member 85A, thereby connecting the pallet rail 85 to the remainder of the pallet support rail assembly 80.

The horizontal rail members 85B are planar and protrude, jut, and/or otherwise extend, partially into the lane "L". The horizontal rail members 85B have upper and lower surfaces which are parallel to the ground or floor, an inner edge and an outer edge. The inner edge of each of the horizontal rail member 85B is fixed to a lower portion of the vertical rail member 85A.

In the complete assemblage of the racking assembly 70, corresponding pairs of pallet support rail assemblies 80, on opposite sides of the respective lanes "L", each define a space between the individual rail assemblies within the pair. In other words, within a cooperative pair of the rail assemblies 80, the outer edge of a first horizontal rail member 85B and the outer edge of a second horizontal rail member 85B, namely the edges which extend furthest into the lane "L", define a space therebetween, e.g. a rail space "RS". The magnitude of the distance between the rail assemblies 80, which generally defines the rail space "RS", corresponds to the width of a pallet to be stored thereupon. Namely, the rail space "RS" defines an opening distance between the rails which is lesser in magnitude than the width dimension of a pallet to be stored thereupon.

Accordingly, the rail assemblies 80, in each respective pair, cooperate to at least partially define receiving structure to accept, for example, a pallet 90 therein and/or thereupon. In the receiving structure, the upper surfaces of horizontal rail members 85B interface with the bottom surface of the pallet 90. The vertical rail members 85A provide lateral, mechanical boundaries which facilitate suitable lateral placement of the pallet 90 over the rail assemblies 80, and resist non-desired lateral shifting of the pallet 90 when it is stored upon the rail assemblies 80.

The pallet 90 is a typical pallet, e.g. a wooden, portable, platform adapted and configured for storing, holding, and/or to facilitate moving, objects, loads, and/or other goods such as a load 95. The load 95 comprehends various suitable objects, loads, and/or other goods, which include, but are not limited to, single SKU loads, mixed-case loads, and/or others.

In a typical warehouse environment, the lane width "LW" is greater in magnitude than the width dimension of the forklift 10. This permits the forklift 10, with the pallet 90, to travel down the length of the lane "L". The rail space "RS" is greater in magnitude than the width dimension of forklift 10, which again permits the forklift 10, with the pallet 90, to travel down the length of the lane "L". Accordingly, the lane width "LW" is also greater in magnitude than a width dimension PW of the pallet 90 and the load 95. However, the rail space "RS" is smaller in magnitude that the width dimension PW of the pallet 90, which enables the rail assemblies 80 to support, store, and/or otherwise hold, the pallet 90 thereupon. Thus, an operator of the forklift 10 must raise the pallet 90 and the load 95 to the desired height of storage before entering the lane "L".

Referring now to FIGS. 4, 5, 6, 7A, 7B, 7C, 8, and 9, the roll cage protector assembly 100A, 100B, 100C, 100D, 100E, 100F is attached to the forklift vehicle 10, at or adjacent to the roll cage 20, and offers at least some protection to the roll cage 20 from e.g. grinding, scraping, cutting, abrading, and/or other wear.

Referring now to FIGS. 4, 5, 6, 7A, 7B, and 7C, the roll cage protector assembly 100A, B, C, includes first and second protector members, namely a housing 110 and an removable insert 200. The housing 110 has a length dimension, a width dimension, an inwardly facing surface and an outwardly facing surface. As shown in FIGS. 1, 2, 3, 4, 5, 6, 7A, 7B, and 7C, the housing 110 includes a back plate 112, a lower bracket 115, and an upper bracket 120.

The back plate 112 is a planar, elongated member. The back plate 112 has an inwardly facing surface and an outwardly facing surface. The inwardly facing surface of the back plate 112 corresponds to the inwardly facing surface of the housing 110 and is adapted and configured to communicate with portions of the forklift 10, e.g. the roll cage 20. The outwardly facing surface of the back plate 112 faces in an opposite direction and therefore faces outwardly away from the forklift 10 when the roll cage protector assembly 100A, 100B, 100C, 100D is installed thereto.

Figure 5:
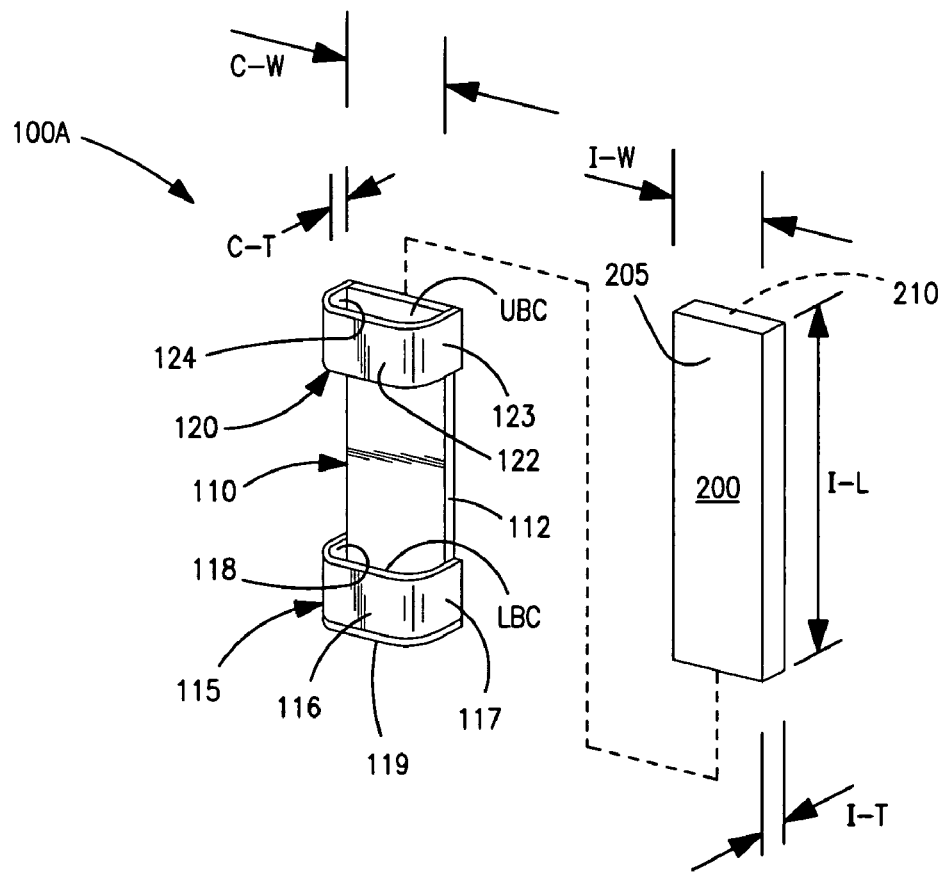
FIG. 5 shows an enlarged, pictorial, exploded view of one of the forklift roll cage protector assemblies of FIG. 1.

Referring now to FIG. 5, the lower bracket 115 includes an outer wall 116, a pair of sidewalls 117, 118, and a bottom wall 119. The outer wall 116 is planar and has inwardly and outwardly facing surfaces, lateral edges, and extends parallel to the back plate 112. The inwardly facing surface of the outer wall 116 faces toward the outwardly facing surface of the back plate 112. These two facing surfaces, and thus the back plate 112 and the outer wall 116, are spaced from each other and define a void therebetween.

Each of the pair of sidewalls 117 and 118 is a planar member with an inwardly facing surface and an outwardly facing surface. Each sidewall 117 and 118 extends perpendicularly outwardly away from the back plate 112, away from the forklift 10.

The sidewall 117 extends outwardly away from a first lateral edge of the back plate 112 and connects to a first lateral edge of the outer wall 116. The sidewall 118 extends outwardly away from a second lateral edge of the back plate 112 and connects to a second lateral edge of the outer wall 116. The inwardly facing surfaces of the pair of sidewalls 117, 118 face each other, thus the pair of sidewalls 117 and 118 are spaced from each other and define a void therebetween, which is aligned with the void defined between the back plate 112 and the outer wall 116.

The bottom wall 119 is a planar member that has an upper surface and a lower surface. The bottom wall 119 is parallel to e.g. the ground or floor and extends outwardly away from the back plate 112. In other words, the bottom surface of the bottom wall 119 faces towards the ground or floor while the upper surface faces towards the remainder of the roll cage protector assembly 100A, 100B, 100C, 100E. The perimeter of the upper surface of the bottom wall 119 communicates with the bottom edges of ones of the outer wall 116, the sidewall 117 and the sidewall 118. Thus, the bottom wall 119 provides a closure structure for the lower portion of the lower bracket 115.

The upper portion of the lower bracket 115 remains open and this opening is adapted and configured to receive objects, such as an removable insert 200, therein and/or therethrough. Accordingly, the outwardly facing surface of the back plate 112, the inwardly facing surface of the outer wall 116, the inwardly facing surfaces of the pair of sidewalls 117 and 118, and the upper surface of the bottom wall 119, in combination, define an outer perimeter of a void space or cavity, e.g. a lower bracket cavity "LBC".

The upper bracket 120 includes an outer wall 122, a pair of sidewalls 123, 124, but no bottom wall. The outer wall 122 is planar and has inwardly and outwardly facing surfaces, lateral edges, and extends parallel to the back plate 112. The inwardly facing surface of the outer wall 122 faces towards the outwardly facing surface of the back plate 112. These two facing surfaces, and thus the back plate 112 and the outer wall 122 are spaced from each other and define a void therebetween.

Each of the pair of sidewalls 123 and 124 is a planar member with an inwardly facing surface and an outwardly facing surface. Each of the pair of sidewalls 123 and 124 extends perpendicularly outwardly away from the back plate 112, away from the forklift 10.

The sidewall 123 extends outwardly away from a first lateral edge of the back plate 112 and connects to a first lateral edge of the outer wall 122. The sidewall 124 extends outwardly away from a second lateral edge of the back plate 112 and connects to a second lateral edge of the outer wall 122. The inwardly facing surfaces of the pair of sidewalls 123 and 124 face each other and the pair of sidewalls 123 and 124 are spaced from each other and define a void therebetween, which is aligned with the void defined between the back plate 112 and the outer wall 122.

The upper and lower portions of the upper bracket 120 remain open, thereby defining an upper opening and a lower opening. These openings are adapted and configured to receive objects, such as the removable insert 200, therein and/or therethrough. Accordingly, the outwardly facing surface of the back plate 112, the inwardly facing surface of the outer wall 122, and the inwardly facing surfaces of the pair of sidewalls 123 and 124, in combination, define an outer perimeter of a void space or cavity, e.g. an upper bracket cavity "UBC". In other words, an aperture passes vertically through the upper bracket 120, and the space defined between the aperture walls corresponds to the outer perimeter of the upper bracket cavity "UBC".

The lower bracket "LBC" and the upper bracket "UBC" are vertically aligned with each other. Accordingly, an imaginary straight line path extends through the upper opening of the upper bracket 120, through the upper bracket cavity "UBC", out the lower opening of the upper bracket 120, parallel to, and along a portion of the length of the back plate 112, through the opening at the top of the lower bracket 115, and into the lower bracket cavity "LBC".

Each of the lower bracket cavity "LBC" and the upper bracket cavity "UBC" define a cavity width dimension and a cavity thickness dimension, e.g. a cavity width dimension "C-W" and a cavity thickness dimension "C-T". The magnitude of the cavity width dimension "C-W" and the cavity thickness dimension "C-T" of the lower bracket 115 and the magnitude of the cavity width dimension "C-W" and the cavity thickness dimension "C-T" of the upper bracket 120 may correspond to each other, or may not, depending on the particular configuration of, for example, the particular removable insert 200 to be housed therein. Thus, the lower and upper brackets 115 and 120 can have similar, or dissimilar, magnitudes of cavity width dimensions "C-W" and cavity thickness dimensions "C-T", and/or other characteristics and configurations, as desired. Regardless, the lower and upper brackets 115 and 120, individually or in combination, are adapted and configured to e.g. receive, accept, house, retain, and/or otherwise hold, the removable insert 200 therein.

The removable insert 200 is secured to the outer surfaces of each of the pair of uprights 30, 35, 40 or 45. The removable insert 200 is an elongated, rectangular member, although other suitable shapes and configurations are well within the scope of the invention. As illustrated in FIG. 5, the removable insert 200 has a length dimension "I-L", and a width dimension "I-W". The removable insert 200 has an outwardly facing surface 205 and an inwardly facing surface 210. The outwardly and inwardly facing surfaces 205 and 210 define an insert thickness dimension "I-T" therebetween.

The removable insert 200 is adapted and configured to interface with, for example, objects which might otherwise interface with the roll cage 20. Such objects include, but are not limited to: the pallet support rail assembly 80, and/or other components of the racking assembly 70. Thus, the removable insert 200 offers at least some protection to the roll cage 20 from impacts, punctures, scrapes, scuffs, scratches, slices, grinds, cuts, abrasions, and/or other wear, damage, or other compromises to the integrity of the roll cage 20. In other words, the removable insert 200 is adapted and configured to absorb scraping, cutting, and/or other interfacing contacts which would otherwise be imparted upon the roll cage 20.

The removable insert 200 is made of materials which possess the desired characteristics, features, qualities, traits, and/or other property which enable the removable insert 200 to last for a suitable useful life in the intended environment.

In some embodiments, the removable insert 200 is made of a polymeric material. Exemplary of suitable polymeric materials for use in the removable insert 200 include, but are not limited to: a variety of high density polyethylenes. In some embodiment, the removable insert 200 is made of various other ones of the polyethylenes, or various polypropylenes. There can also be mentioned as examples such polymers suitable for use in the removable insert 200 as polyvinyl chloride and chlorinated polyvinyl chloride copolymers, various kinds of polyamides, various kinds of polycarbonates, and others.

In some embodiments, the removable insert 200 is made of a non-polymeric material, such as from various metallic materials, such as when relatively greater durability and/or relatively longer useful life is desired as compared to polymeric construction of the removable insert 200. As desired, the removable insert 200 can be made of various metal alloys including, but not limited to: anodized aluminum, aluminum, steel, stainless steel, titanium, magnesium, brass, and their respective alloys.

In the complete assemblage of the roll cage protector assembly 100A, B, C, and others, at least a portion of the removable insert 200, e.g. the outwardly facing surface 205, is for example, laterally uncovered, visible, accessible, and/or otherwise exposed. Thus, the outwardly facing surface 205 and/or other portions of the removable insert 200, such as lateral edges and/or other surfaces, are subject to interfacing with the rail assembly 80.

To enable insertion of the removable insert 200 into the housing 110, the magnitude of the cavity thickness dimension "C-T" of each of the lower and upper brackets 115 and 120, is relatively greater than the magnitude of the thickness dimension "I-T" of the removable insert 200. And the magnitude of the cavity width dimension "C-W" of each of the lower and upper brackets 115 and 120 is relatively greater than the magnitude of the width dimension "I-W" of the removable insert 200. Thus, the housing 110 and the removable insert 200 are cooperatively sized and configured to enable the removable insert 200 to be removable held in the housing 110.

When the removable insert 200 is held in the housing 110, the outwardly facing surface of the back plate 112 is in face to face communication with the inwardly facing surface 210 of the removable insert 200. The oppositely facing surface of the removable insert 200, namely the outwardly facing surface 205, is positioned for wear to its surface, and thus relieves the roll cage 20 from such wear. The removable insert 200 is vertically retained, e.g. resists falling downwardly out from the housing 110, by the mechanical interface between the lower edge or surface of the removable insert 200 and the upwardly facing surface of the bottom wall 119 of the housing 110.

The removable insert 200 is horizontally and/or laterally retained by the mechanical interfacing relationships between the respective ones of the outwardly and the inwardly facing surfaces 205 and 210 of the removable insert 200, various other edges and surfaces of the removable insert 200, and corresponding inwardly facing surfaces of the outer wall 116, the pair of sidewalls 117 and 118, the outer wall 122, and the pair of sidewalls 123, 124 of the lower and upper brackets 115 and 120. In other words, the bottom wall 119 of the lower bracket 115 prevents the removable insert 200 from falling out of the bottom of the housing 110. The brackets 115 and 120 suitably prevent the removable insert 200 from otherwise falling out of the housing 110.

Referring again to FIGS. 1, 2, and 3, the position at which the roll cage protector assembly 100A is mounted to the roll cage 20 corresponds to the distance between a level or tier of pallet support rail assemblies 80 and the ground or floor. A sufficient amount of the removable insert 200 is exposed, when held in the housing 110, to enable the removable insert 200, and not the roll cage 20, to contact the rail assembly 80 despite various environmental and operational factors, fluctuations, and/or other variables and differences.

Example of such factors and operational differences are (i) nominal or other differences in the height of the rail assembly 80 along the length of the lane "L", (ii) differences in height between separate rail assemblies 80 in different lanes "L", (iii) dynamic suspension compression and extension of the forklift 10, in forklifts with suspension components, during its operation which tends to correspondingly dynamically change the distance between the roll cage protector assembly 100A and the ground or floor, (iv) changes over time in tire pressure of pneumatic tires on the forklift 10 which would change the distance between the roll cage protector assembly 100 and the ground or floor, (v) differences in the mass of the different pallets 90 and/or loads 95 which would result in different magnitudes of compressions of suspension and/or tire components which would change the distance between the roll cage protector assembly 100A and the ground or floor, and/or (vi) other variables which might tend to relatively increase or relatively decrease the distance between the roll cage protector assembly 100A and the ground or floor.

In environments in which there is relatively less variation in the distance between the roll cage protector assembly 100A and the ground or floor, a user can choose to mount a roll cage protector assembly 100A which exposes relatively less surface area of the removable insert 200. As one example, a relatively shorter removable insert 200 can be utilized in situations where there is relatively less variation in the distance between the roll cage protector assembly 100A and the ground or floor, or where there is less variation between the exact heights of different rail assemblies 80. In such embodiments, the length dimension of the removable insert 200 has a magnitude of from between about 1 inch to about 5 inches. Desirably, the length dimension of the removable insert 200 has a magnitude of at least about 2 inches. More desirably, the length dimension of the removable insert 200 has a magnitude of at least about 2.5 inches. Even more desirably, the length dimension of the removable insert 200 has a magnitude of at least about 3 inches. Still more desirably, the length dimension of the removable insert 200 has a magnitude of at least about 3.5 inches or more.

In applications in which there is relatively more variation in the distance between the roll cage protector assembly 100A and the ground or floor, a user can choose to mount the roll cage protector assembly 100A such that more surface area of the removable insert 200 is exposed. As one example, a relatively longer removable insert 200 can be utilized in situations where there is relatively more variation in the distance between the roll cage protector assembly 100A and the ground or floor, or where there is more variation between the exact heights of the different rail assemblies 80. In such embodiments, the length dimension "I-L" of the removable insert 200 has a magnitude of at least about 4 inches. Desirably, the length dimension "I-L" of the removable insert 200 has a magnitude of at least about 4.5 inches. More desirably, the length dimension "I-L" of the removable insert 200 has a magnitude of at least about 5 inches or more.

The thickness dimension of the removable insert 200 is selected based, at least in part, on the intended use environment of the roll cage protector assembly 100A and/or the desired temporal scope of the useful life of the removable insert 200. Thus, when the roll cage protector assembly 100A, 100B, 100C, 100D, 100E and 100F is subjected to relatively more interfacing contact, e.g. grinding, scraping, cutting, abrading and/or other wear stresses, the removable insert 200 is made thicker. Or, when a relatively longer useful life of the removable insert 200 is desired, the removable insert 200 is thicker so as to enable relatively more grinding, scraping, cutting, abrading and/or other wear stresses, before the removable insert 200 needs to be replaced. Exemplary of various suitable thickness dimensions "I-T" of the removable insert 200 include, but are not limited to: at least about 0.2 inches, optionally at least about 0.5 inch, optionally at least about 0.8 inch, optionally at least about 1 inch, optionally others. Desirably, the thickness dimensions "I-T" of the removable insert 200 can range from between about 0.2 inches to about 1 inch.

Regardless of the exact dimensions of the embodiments of the removable insert 200, the removable insert 200 is adapted, sized, and configured to cooperate with, and be held in the housing 110. As desired, the removable insert 200 can be relatively loosely retained in the housing 110 or be tightly retained in the housing 110, such as by a friction fit or otherwise.

Figure 7A:
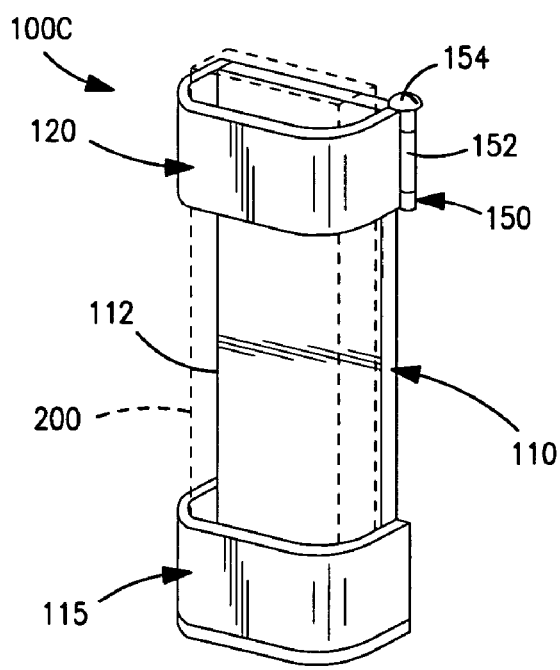
FIG. 7A shows a pictorial view of a third embodiment of forklift roll cage protector assemblies of the invention.
Figure 7B:
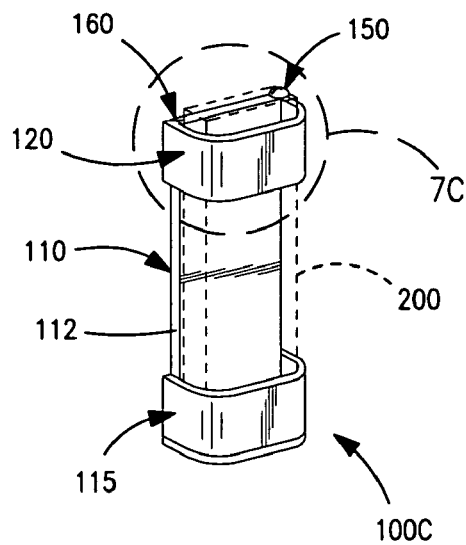
FIG. 7B shows a pictorial view of a fourth embodiment of forklift roll cage protector assemblies of the invention.
Figure 7C:
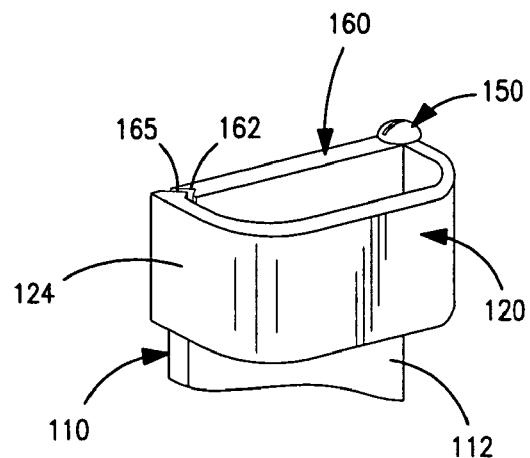
FIG. 7C shows an enlarged, pictorial, view of a portion of the protector assembly of FIG. 7B.

Referring now to FIGS. 7A, 7B, and 7C, the housing 110 can include a hinge assembly 150. The hinge assembly 150 enables the housing 110 to, for example, clamp the removable insert 200 or to facilitate removal, insertion, and/or securement of the removable insert 200 whether or not the removable insert 200 is loosely, snuggly, or tightly, held in the housing 110.

Referring to FIG. 7A, the hinge assembly 150 includes a hinge barrel 152 and a hinge pin 154 which pivotally attaches the upper bracket 120 to the back plate 112. The hinge barrel 152 includes a plurality of cylindrical members, each with a bore that extends axially therethrough. At least one of the cylindrical members is attached near the top of the back plate 112 and adjacent to an outer edge of the back plate 112. Other ones of the cylindrical members are attached to the upper bracket 120, e.g. adjacent to terminal edges of the pair of sidewall 123 or 124.

The cylindrical members of the hinge assembly 150 are coaxially aligned to one another and each is positioned parallel to the back plate 112, whereby the individual bores of the respective cylindrical members collectively define a through bore which extends through the entirety of the hinge assembly 150. The hinge pin 154 extends axially through the bore of the hinge assembly 150 and defines an axis of pivotation of the hinge assembly 150. Accordingly, the hinge pin 154 mechanically and pivotably couples the cylindrical members to each other so as to define a hinged connection between the back plate 112 and the upper bracket 120.

Referring now to FIGS. 7B and 7C, in some embodiments, the roll cage protector assembly 100C further includes a clasp mechanism 160, which enables the upper bracket 120 to securingly interface with the back plate 112, when the upper bracket 120 is hinged thereto. The clasp mechanism 160 includes a receiving depression 162 and a bracket protrusion 165.

The receiving depression 162 can be a kerf, a groove, a channel, and/or other depression, which extends into a lateral outer edge of the back plate 112, partially along the length of the back plate 112. The receiving depression 162 is adapted and configured to cooperate with the bracket protrusion 165 and, for example, snap-lockingly receive the bracket protrusion 165 therein.

The bracket protrusion 165 extends outwardly from and along the length of the inwardly facing surface of the sidewall 124, adjacent to the outer edge of the sidewall 124. The bracket protrusion 165 includes first and second ramped surfaces. The first and second ramped surfaces can intersect the sidewall 124 at different angles of intersection.

The ramped surface nearest to the outer edge of the sidewall 124 defines an angle of intersection of relatively lesser magnitude than the magnitude of the angle of intersection of the ramped surface which is distal to the sidewall outer edge. Accordingly, it is relatively easier to urge the clasp mechanism 160 into the closed, secured, position than it is to urge the clasp mechanism 160 open. This correspondingly decreases the likelihood of non-desired hinge opening of the upper bracket 120. To open the bracket 120, which incorporates the hinge assembly 150 and the clamp mechanism 160, the user pulls the terminal end of the sidewall 124 outwardly away from the housing 112 which flexes the bracket 120 sufficiently far to create adequate clearance between the receiving depression 160 and the bracket protrusion 165, whereby the bracket 120 can be opened, for example, by pivoting about the hinge pin 154.

Figure 8:
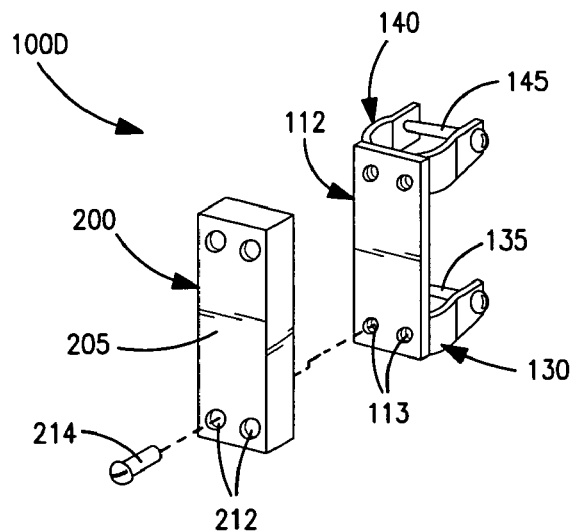
FIG. 8 shows a pictorial view of a fifth embodiment of forklift roll cage protector assemblies of the invention.

In the alternative to holding the removable insert 200 by way of brackets, e.g. lower and upper brackets 115 and 120, the removable insert 200 can be boltingly secured to the back plate 112, such as in the embodiment of the roll cage protector assembly 100D, illustrated in FIG. 8. The back plate 112 of the roll cage protector assembly 100D includes one or more threaded bores 113 which extend perpendicularly therethrough. The removable insert 200 includes one or more through bores 212 which extend perpendicularly therethrough. In the assemblage of the roll cage protector assembly 100D, the through bores 212 of the removable insert 200 and the threaded bores 113 of the back plate 112 are aligned coaxially to one another. A threaded bolt 214 extends through each of the bores 212 and threads into one of the threaded bores 113. As desired, the bores 212 can include a countersunk surface which enables the head of threaded bolt 214 to be housed within the removable insert 200 and not extend outwardly from the outwardly facing surface 205. Thus, when desired, the threaded bores 113, the through bores 212, and the threaded bolts 214, can be used in lieu of, or in addition to, the lower and upper brackets 115 and 120.

Referring now to FIGS. 1, 2, 3, 4, 5, 7A, 7B, and 7C, the roll cage protector assembly 100A, 100B, 100C is secured to the roll cage 20 by means of welding. FIG. 1 illustrates such attachment at weldment "W" which joins the back plate 112 to ones of the uprights 30, 35, 40, and 45. The weldment "W" results from any of a variety of suitable welding methods and materials such as electrodes and other welding consumables. Such suitable welding processes and methods include, but are not limited to: shielded metal arc welding, gas tungsten arc welding, gas metal arc welding, and/or others.

Figure 6:
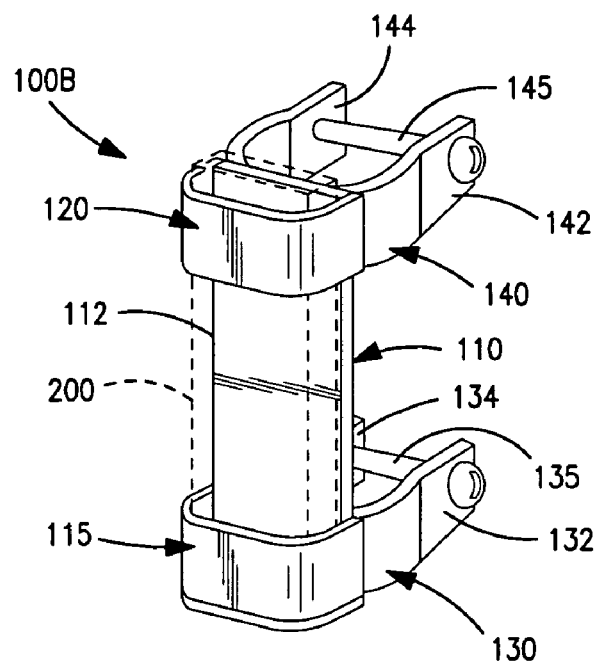
FIG. 6 shows a pictorial view of a second embodiment of forklift roll cage protector assemblies of the invention.

In the embodiments shown in FIGS. 6 and 8, the roll cage protector assembly 10B, 100D is secured to the roll cage 20 by means of a lower mounting clamp 130 and an upper mounting clamp 140, in lieu of, or in addition to, the weldment "W". The lower mounting clamp 130 includes clamp lobes 132, 134 and a bolt 135. Each of the lobes 132 and 134 has in inwardly facing surface and each extends perpendicularly from the inwardly facing surface of the back plate 112 and is adapted and configured to resiliently, grip and/or otherwise frictionally interface with portions of the roll cage 20.

A bore (not labeled) extends through the end of each of the lobes 132 and 134 of the lower clamp 130. The bore is located distal to the back plate 112. The bore which extends through the lobe 132 and the bore which extends through the lobe 134 are coaxially aligned with each other. A bolt 135 extends through the bores of each of the lobes 132 and 134, and is adapted and configured to draw the unsecured ends of the lobes 132 and 134, namely the ends which are not secured to the back plate 112, nearer to each other.

The inwardly facing surfaces of the lobes 132 and 134 grippingly interface the outer surface of respective ones of the uprights 30, 35, 40, and 45. When the bolt 135 is tightened, the lobes 132 and 134 correspondingly tighten about the respective ones of the uprights 30, 35, 40 and 45. Accordingly, when the bolt 135 is sufficiently tightened, the lower clamp 130 sufficiently tightens upon the respective upright 30, 35, 40 and 45 so as to at least partially prevent non-desired movement of the roll cage protector assembly 100B, 100D thereupon.

An upper mounting clamp 140 includes clamp lobes 142 and 144 and a bolt 145. Each of the lobes 142 and 144 has an inwardly facing surface and each extends perpendicularly from the inwardly facing surface of the back plate 112. Each of the lobes 142 and 144 is adapted and configured to resiliently and/or grippingly interface portions of the roll cage 20.

A bore (not labeled) extends through the end of each of the lobes 142 and 144 of the upper clamp 140, in particular, the end of each of the lobes 142 and 144 which is most distal to the back plate 112. The bore which extends through the lobe 142 and the bore which extends through the lobe 144 are coaxially aligned to each other. The bolt 145 extends through the bores of each of the lobe 142 and 144, and is adapted and configured to draw the unsecured ends of the lobes 142 and 144, namely the ends which are not secured to the back plate 112, nearer to each other.

The inwardly facing surfaces of the lobes 142 and 144 grippingly interface the outer surface of respective ones of the uprights 30, 35, 40, and 45. When the bolt 145 is tightened, the lobes 142 and 144 correspondingly tighten about the respective ones of the uprights 30, 35, 40 and 45. Accordingly, when the bolt 145 is sufficiently tightened, the upper clamp 140 sufficiently tightens upon the respective upright so as to at least partially prevent non-desired movement, e.g. sliding, rotation, and/or other movement, of the roll cage protector assembly 100B, 100D upon the respective upright of the roll cage 20.

Figure 9:
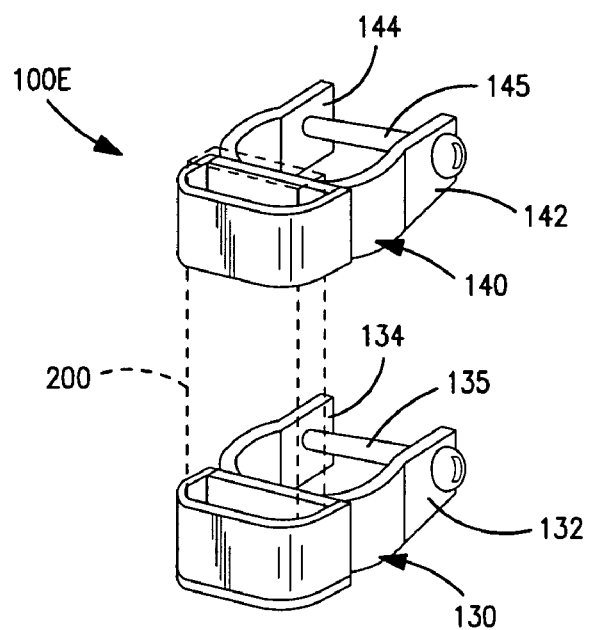
FIG. 9 shows a pictorial view of the forklift roll cage protector assembly of FIG. 6, without the back-plate.

Referring now to FIG. 9, the roll cage protector assembly 100E is an analog of the roll cage protector assembly 10B, but without the back plate 110. Thus, whereas the lower bracket 115 and the upper bracket 120 of the protector assembly 100B are relatively spatially fixed with respect to each other, the lower bracket 115 and the upper bracket 120 of the protector assembly 100E are adapted and configured to move with respect to each other. In other words, a user can loosen the bolt 135 and/or the bolt 145 and move the lower bracket 115 and/or the upper bracket 120 nearer to or further from each other. The user can then re-tighten the bolt 135 and/or the bolt 145 to again secure the lower and the upper mounting clamps 130 and 140, and thus the lower and the upper brackets 115 and 120, to a respective upright 30, 35, 40 or 45 of the roll cage 20.

In some embodiments, in lieu of, or in addition to, attaching the roll cage protector assembly 100A, 100B, 100C, 100D, 100E to the roll cage 20 by means of the weldment "W" and/or the lower and upper mounting clamps 130 and 140, other suitable mounting methods and, when required, hardware are utilized. As one example, those skilled in the art are well aware of various adhesives which are suitable for joinder between like and dissimilar metallic materials, and between non-metallic materials and metallic materials. Such adhesives include, but are not limited to, various methacrylate structural adhesives, elastomeric-epoxies, thixotropic-epoxies, and/or other epoxies and other adhesives.

In some embodiments, other suitable hardware components and configurations are utilized. As one example, in lieu of, or in addition to, the lower and upper mounting clamps 130 and 140, the roll cage protector assembly 100A, 100B, 100C, 100D, 100E can include one or more threaded posts which extend perpendicularly outwardly away from the inwardly facing surface of the back plate 112. To install such a protector assembly 100A, 100B, 100C, 100D, 100E, the user can drill one or more holes through the roll cage 20, inserts the treaded post of the protector assembly 100A, 10B, 100C, 100D, 100E therethrough, and e.g. secure the protector assembly 100A, 100B, 100C, 100D, 100E to the roll cage 20 by corresponding hardware such as a suitable threaded-nut.

Figure 10:
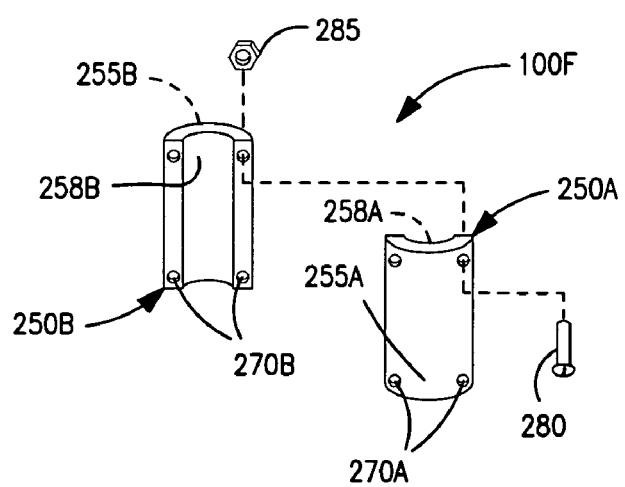
FIG. 10 shows a pictorial view of a sixth embodiment of forklift roll cage protector assemblies of the invention.

Referring now to FIG. 10, in some embodiments the first and second protector members of the roll cage protector assembly 100A, 100B, 100C, 100D, 100E perform both the wear absorption function and the mounting function. Exemplary of such embodiments is the roll cage protector assembly 100F. The roll cage protector assembly 100F includes first and second protector members 250A and 250B, a bolt 280 and a nut 285. As illustrated, the first and second protector members 250A and 250B are substantially mirror images of each other.

Each of the protector members 250A and 250B has a length, an outwardly facing surface 255A, 255B, and an inwardly facing surface 258A, 258B. Bores 270A extend through the protector member 250A, between the outwardly and the inwardly facing surfaces 255A and 258A. Bores 270B extend through the protector member 250B, between the outwardly and the inwardly facing surfaces 255B and 258B. In use of the complete assemblage of the protector assembly 100F, respective ones of the bores 270A and the bores 270B are coaxially aligned with each other.

The bolts 280 pass axially through the respective, aligned pairs of bores 270A, 270B. The terminal end of the bolt 280 extends outwardly beyond the outer surface 255B of the protector member 250B. This enables the bolt 280 to threadedly engage the nut 285. In some embodiments, the bores 270B have a threaded inner-circumferential surface. In such embodiments, the bolts 280 can threadedly engage the bores 270B, whereby the use of the nuts 285 is eliminated or optional. When the bolts 280 are sufficiently tightened, the first and second protector members 250A and 250B are urged toward each other, whereby the inner surfaces 250A, 250B clampingly, grippingly and/or otherwise frictionally engage the respective upright 30, 35, 40 or 45 of the roll cage 20.

To use the roll cage protector assemblies 100A, 100B, 100C, 100D, 100E, 100F, the user first determines the desired height at which the protector assemblies 100A, 100B, 100C, 100D, 100E, 100F will be installed upon the roll cage 20. Thus, the user determines the distance from the ground or floor at which the potentially scraping, cutting, or other potentially roll cage damaging object, such as the rail member 85B of the support rail assembly 80, is mounted.

The user then positions the roll cage protector assemblies 100A, 100B, 100C, 100D, 100E, 100F, upon the roll cage 20 at the desired height, position, location, and/or orientation. The user attaches the roll cage protector assemblies 100A, 100B, 100C, 100D, 100E, 100F, to the roll cage 20 by way of, for example, the weldment "W", the lower and upper mounting clamps 130, 140, the first and second protector members 250A and 250B, and/or other suitable methods such as through utilization of various adhesives, hardware, and others.

After a sufficient amount of use and thus a sufficient amount of contact with the rail assembly 80, the e.g. outwardly facing surface of one of the protector members 100A, 100B, 100C, 100D, 100E, 100F, such as the outwardly facing surface 205, the outwardly facing surface 255A, or the outwardly facing surface 255B, becomes sufficiently worn so that replacement is required. The user can replace the worn removable insert 200 or the protector members 250A and 250B with a new removable insert 200 or with new protector members 250A and 250B.

Or, if desired, a user of the roll cage protector assemblies 100A, 100B, 100C, 100D, 100E, can remove the worn removable insert 200 from the lower and upper mounting clamps 130 and 140, rotate the insert so that the inwardly facing surface 210 then faces outwardly, and place the insert back into the lower and upper mounting clamps 130 and 140. In so doing, the user exposes a relatively un-worn surface of the removable insert 200 to the impacts, punctures, scrapes, scuffs, scratches, slices, grinds, cuts, abrasions, and/or other wear-type damage caused, at least partially, by e.g. contacting the rail assembly 80.

If desired, a user of the roll cage protector assembly 100F can loosen the bolts 280 and rotate the protector assembly 100F about, for example, the upright 30, 35, 40 or 45 of the roll cage 20 to which it is mounted. Thus, the user can expose a relatively un-wore surface of the protector assembly 100F to the impacts, punctures, scrapes, scuffs, scratches, slices, grinds, cuts, abrasions, and/or other wear-type damage caused, at least partially, by e.g. contacting the rail assembly 80.

The roll cage protector assemblies 100A, 100B, 100C, 100D, 100E, 100F should be constructed of materials which resist corrosion, and are suitably strong and durable for normal extended use. Those skilled in the art are well aware of certain metallic and non-metallic materials which possess such desirable qualities, and appropriate methods of forming such materials.

Appropriate metallic materials for components of the roll cage protector assemblies 100A, 100B, 100C, 100D, 100E, 100F include, but are not limited to: anodized aluminum, aluminum, steel, stainless steel, titanium, magnesium, brass, and their respective alloys. Common industry methods of forming such metallic materials include: casting, forging, shearing, bending, machining, riveting, welding, powdered metal processing, extruding and others.

Non-metallic materials suitable for the various components of the roll cage protector assemblies 100A, 100B, 100C, 100D, 100E, 100F, e.g. the removable insert 200, the protector members 250A and 250B, and others, are various polymeric compounds. For example, the polyolefins can include a variety of the polyethylenes, e.g. high density polyethylene, or polypropylene. Additional materials include polymers, such as polyvinyl chloride and chlorinated polyvinyl chloride copolymers, various polyamides, polycarbonates, and others.

For any polymeric material employed in structures of the invention, any conventional additive package can be included such as, for example and without limitation, slip agents, anti-block agents, release agents, anti-oxidants, fillers, and plasticizers, to control e.g. processing of the polymeric material as well as to stabilize and/or otherwise control the properties of the finished processed product, also to control hardness, bending resistance, and the like.

Common industry methods of forming such polymeric compounds will suffice to form the non-metallic components of the roll cage protector assemblies 100A, 100B, 100C, 100D, 100E, 100F. Exemplary, but not limiting, of such processes are the various commonly-known plastics converting processes.

The roll cage protector assemblies 100A, 100B, 100C, 100D, 100E, 100F can be manufactured as individual components, and the individual components assembled as sub-assemblies, including but not limited to: the housing 110, the lower and upper mounting clamps 130 and 140, the removable insert 200, and others. Each of the aforementioned sub-assemblies is then assembled to respective other ones of the sub-assemblies to develop an assembly of the roll cage protector assemblies 100A, 100B, 100C, 100D, 100E, 100F.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A protector assembly for a roll cage on a vehicle, comprising:
    a) a roll cage including a pair uprights, each of said uprights having a first end secured to said vehicle and a second end secured to a roof member, and each of said uprights having an outer surface facing outward away from said vehicle; and
    b) a removable insert secured to said outer surface of each of said uprights, said removable insert capable of protecting said upright to which it is secured from coming in contact with another member and being worn down.

2. The protector assembly of claim 1 wherein said removable insert is formed from a polymeric material.

3. The protector assembly of claim 1 wherein said insert is formed from a non-polymeric material.

4. The protector assembly of claim 1 further comprising a housing attached to said outer surface of each of said uprights, said housing including a back plate having an upper bracket and a spaced apart lower bracket, said upper bracket having a cavity formed therethrough and said lower bracket having a cavity formed therein which is closed by a bottom wall, said back plate having a length dimension, an inwardly facing surface and an outwardly facing surface, and said insert is removably positioned in said housing.

5. The protector assembly of claim 4 wherein said removable insert is capable of sliding completely through said cavity formed in said upper bracket.

6. The protector assembly of claim 4 wherein said upper and lower brackets are vertically aligned with each other.

7. The protector assembly of claim 4 wherein said back plate is welded to said outer surface of each of said uprights.

8. The protector assembly of claim 4 wherein said back plate is clamped to said outer surface of each of said uprights.

9. The protector assembly of claim 1 wherein said removable insert is bolted to each of said uprights.

10. A protector assembly for a roll cage on a vehicle, comprising:
    a) a roll cage including a pair of uprights, each of said uprights having a first end secured to said vehicle and a second end secured to a roof member, and each of said uprights having an outer surface facing outward away from said vehicle;
    b) a housing attached to said outer surface of each of said uprights, said housing including a back plate having an upper bracket and a spaced apart lower bracket, said upper bracket having a cavity formed therethrough and said lower bracket having a cavity formed therein which is closed by a bottom wall, and said back plate having a length dimension, an inwardly facing surface and an outwardly facing surface; and
    c) a removable insert having a length dimension, an inwardly facing surface and an outwardly facing surface, said insert removably positioned within said upper and lower brackets of said back plate, an end of said insert contacting said bottom wall of said cavity formed in said lower bracket, and said inwardly facing surface of said removable insert facing said outwardly facing surface of said back plate.

11. The protector assembly of claim 10 wherein said removable insert has a length of from between about 1 inch to about 5 inches.

12. The protector assembly of claim 10 wherein said removable insert has a thickness of from between 0.2 inches to about 1 inch.

13. The protector assembly of claim 10 wherein said upper bracket includes a hinge assembly.

14. The protector assembly of claim 13 wherein hinge assembly comprises a clasp cooperating with a receiving depression.

15. A protector assembly for a roll cage on a vehicle, comprising:
    a) a roll cage including a pair of tubular uprights, each of said tubular uprights having a first end secured to said vehicle and a second end secured to a roof member, and each of said tubular uprights having an outer surface facing outward away from said vehicle;
    b) a first elongate protector member position adjacent to each of said tubular uprights; and
    c) a second elongate protector member removably connected to each of said first elongate protector members, each of said second elongate protector members being positioned adjacent to said outer surface of each of said tubular uprights, and each of said first and second elongate protector members being retain in a predetermined position on each of said tubular uprights.

16. The protector assembly of claim 15 wherein each of said first and second elongate members has a semi-circular configuration with an inner surface approximating said outer diameter of each of said tubular uprights, and said second elongate member is secured to said first elongated member by a fastener.

17. The protector assembly of claim 16 wherein said first and second elongate members are formed from a polymeric material.

18. The protector assembly of claim 17 wherein said polymeric material is high density polyethylene.

19. The protector assembly of claim 15 wherein said first and second elongate members are mirror images of each other.

20. The protector assembly of claim 19 wherein said first and second elongate members are secured to each other by at least two bolts.

* * * * *